United States Patent [19]

Palmero

[11] Patent Number: 5,611,508

[45] Date of Patent: Mar. 18, 1997

[54] HORIZONTALLY ADJUSTABLE MICROPHONE SUPPORT

[75] Inventor: Albert Palmero, Middlefield, Conn.

[73] Assignee: Tri-tech, Inc., Waterbury, Conn.

[21] Appl. No.: 398,094

[22] Filed: Mar. 3, 1995

[51] Int. Cl.⁶ .................................................. F16M 11/00
[52] U.S. Cl. ........................ 248/123.2; 74/89.15; 901/48; 248/280.11; 248/292.11
[58] Field of Search ........................... 248/123.2, 123.11, 248/280.11, 292.11, 648, 125.1, 125.2, 404, 405; 74/89.15; 16/1 C; 901/48

[56] References Cited

U.S. PATENT DOCUMENTS

| | | | |
|---|---|---|---|
| 1,591,791 | 7/1926 | Sprout | 248/123.2 |
| 3,803,926 | 4/1974 | Winter | 74/89.15 |
| 4,671,478 | 1/1987 | Schoenig | 248/123.2 X |
| 4,793,197 | 12/1988 | Petrovsky | 74/89.15 |
| 4,907,768 | 3/1990 | Masseron | 248/123.11 |
| 5,192,963 | 3/1993 | Hill | 248/280.11 X |

FOREIGN PATENT DOCUMENTS 1444141  12/1988  U.S.S.R. ..................... 901/48

*Primary Examiner*—Ramon O. Ramirez
*Assistant Examiner*—Brian J. Hamilla
*Attorney, Agent, or Firm*—John H. Crozier

[57] ABSTRACT

A horizontally adjustable microphone support, including: a vertical support; a generally horizontal cross member attached to the vertical support; a microphone and a counterweight attached to the horizontal cross member on opposite sides of the vertical support; and apparatus to simultaneously move the microphone and the counterweight selectively inwardly toward or outwardly away from the vertical support so as to prevent the microphone support from tipping over. The horizontal cross member includes first and second telescoping tube pairs. The proximal ends of the inner tubes of the telescoping tube pairs are attached to the electric motor that is mounted in a housing on the distal end of the vertical support. Extending from opposite ends of the electric motor are right-hand and left-hand threaded double-ended shaft sections. Thread followers are attached to inner walls of the inner tube of the telescoping tube pairs surrounding the threaded shaft sections. The thread followers cause the telescoping tube pairs to move axially within the outer tube as the shaft rotates in either direction.

2 Claims, 1 Drawing Sheet

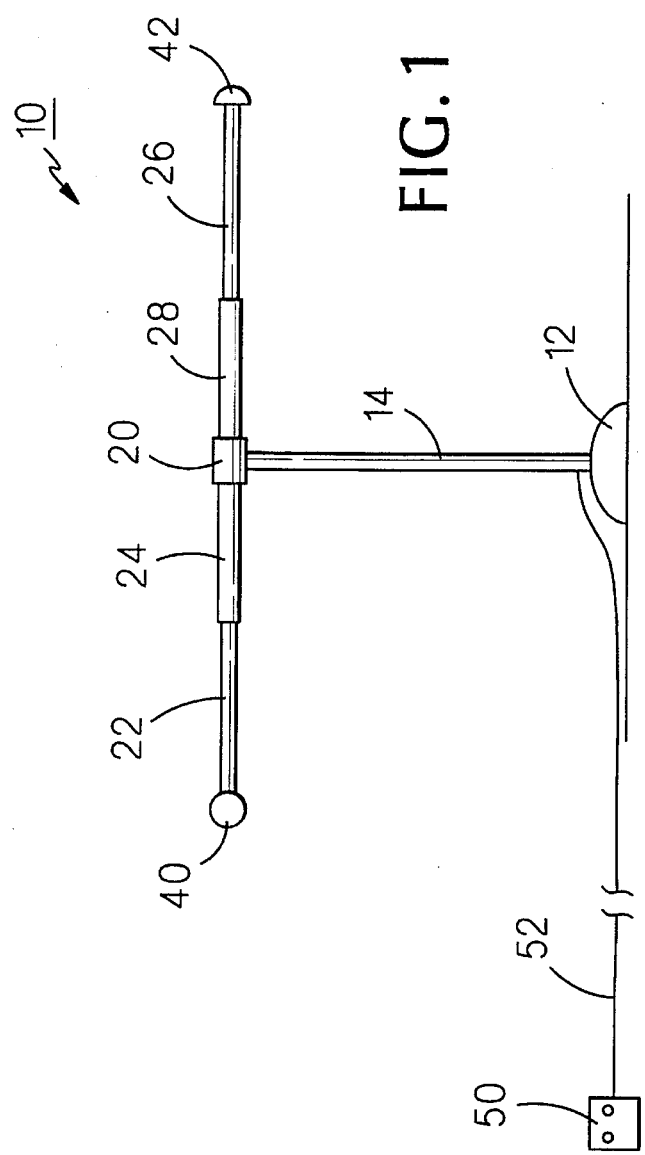
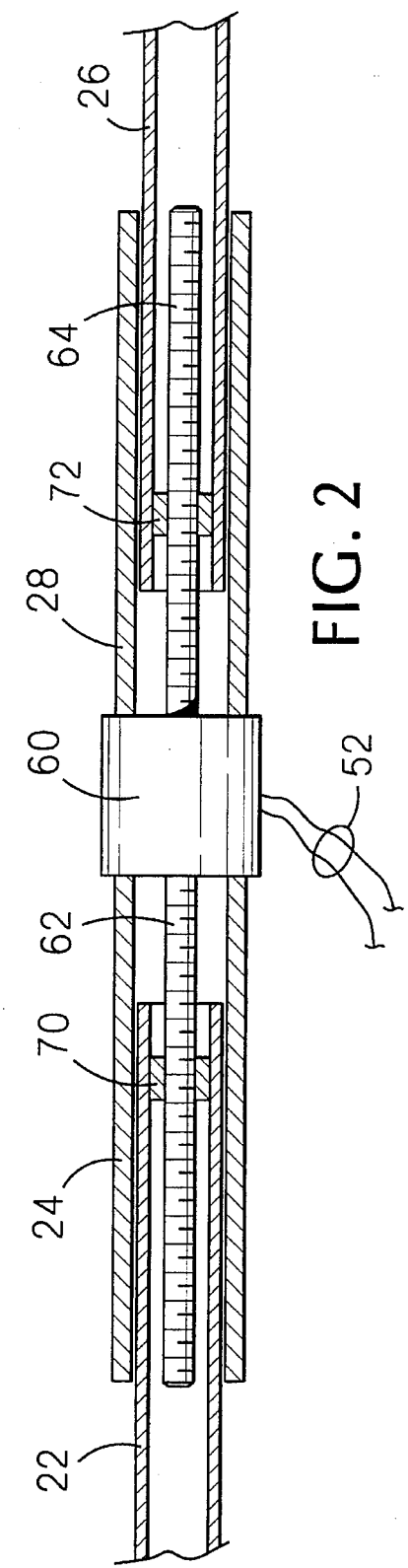

HORIZONTALLY ADJUSTABLE MICROPHONE SUPPORT

BACKGROUND OF THE INVENTION

1. Field of the Invention

The present invention relates to microphones generally and, more particularly, but not by way of limitation, to a novel microphone support that is adjustable horizontally.

2. Background Art

Microphones are used in a variety of applications to, for example, broadcast and/or amplify voices, music, etc. In many such applications, the microphone is mounted on a vertical support rising from a support surface. The support often has means to adjust the vertical height of the microphone; however, any horizontal adjustment, if provided, is limited because of the danger of tipping over the vertical support. Also, such conventional horizontal adjustment requires manual repositioning of the microphone boom, which may detract from the event at which the microphone is being used.

Accordingly, it is a principal object of the present invention to provide a horizontally adjustable microphone support that permits a relatively long extension of a microphone boom in a horizontal direction without danger of tipping over the microphone support.

A further object of the invention is to provide such an adjustable microphone support that can be adjusted by remote control.

An additional object of the invention is to provide such an adjustable microphone support that can be economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a horizontally adjustable microphone support, comprising: vertical support means; a generally horizontal cross member attached to said vertical support means; a microphone and a counterweight attached to said horizontal cross member on opposite sides of said vertical support means; and means to simultaneously move said microphone and said counterweight selectively inwardly toward or outwardly away from said vertical support means so as to prevent said microphone support from tipping over.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 is a side elevational view of a microphone support constructed according to the present invention.

FIG. 2 is a fragmentary, side elevational view, partially in cross-section of the microphone support of the present invention.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a microphone support, generally indicated by the reference numeral 10, constructed according to the present invention. Microphone support 10 includes a conventional base member 12 to which is attached a vertical support member 14 which may include conventional means (not shown) for the vertical adjustment of the vertical support member. The upper end of vertical support member 14 is attached to, and terminates at, a housing 20 from which housing extends a horizontal cross member. The cross member has telescoping tube pairs 22/24 and 26/28 that extend from opposite sides of housing 20. Mounted at the distal end of tube 22 is a counterweight 40 and mounted at the distal end of tube 26 is a microphone 42. The elements of microphone support 10 are so arranged that a remote control 50, by means of an electrical signal transmitted over control line 52, will cause counterweight 40 and microphone 42 to simultaneously move outwardly from, or inwardly toward, housing 20, so as to prevent the tipping over of microphone support 10, the mechanism of which arrangement is described below.

Referring now to FIG. 2, the proximal ends of tubes 24 and 28 are attached to an electric motor 60 disposed in housing 20 (FIG. 1). Motor 60 includes a threaded, double-ended shaft having a righthand threaded shaft section 62 extending from one end of the motor and a lefthand threaded shaft section 64 extending from the other end of the motor. Shaft section 62 is disposed coaxially in telescoping tube pair 22/24 and shaft section 64 is disposed coaxially in telescoping tube pair 26/28. A first thread follower 70 is attached to the inner wall of tube 22 and surrounds and engages shaft section 62 to cause tube 22 to move axially within tube 24 as the shaft section rotates. A second thread follower 72 is attached to the inner wall of tube 26 and surrounds and engages shaft section 64 to cause tube 26 to move axially within tube 28 as the shaft section rotates.

Since shaft sections 62 and 64 have opposite-hand threads and since the shaft sections move together, rotation of motor 60 in one direction will cause simultaneous outward movement of tubes 22 and 26, respectively, in tubes 24 and 28. Similarly, rotation of motor 60 in the other direction will cause simultaneous inward movement of tubes 22 and 26, respectively, in tubes 24 and 28. The result of this arrangement is that counterweight 40 and microphone 42 (FIG. 1) move outwardly and inwardly together, thus preventing the tipping over of microphone support 10 and the degree of extension may be arbitrarily large.

Microphone stand 10 may be economically constructed of any suitable metallic or polymeric materials.

Control 50 is shown as being hard-wired, but could alternatively be a remote RF control.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A horizontally adjustable microphone support, comprising:

(a) vertical support means;

(b) a generally horizontal cross member attached to said vertical support means, said horizontal cross member including first and second telescoping tube pairs, each having an inner tube and an outer tube, extending from opposite sides of said vertical support means;

(c) a microphone and a counterweight attached to said horizontal cross member on said opposite sides of said vertical support means; and (d) means to simultaneously move said microphone and said counterweight selectively inwardly toward or outwardly away from said vertical support means so as to prevent said microphone support from tipping over;

wherein:

(e) proximal ends of said inner tubes of said first and second telescoping tube pairs are attached to an electric motor mounted in a housing disposed at a distal end of said vertical support means;

(f) said electric motor includes a threaded, double-ended shaft having a righthand threaded first shaft section extending from a first end of said electric motor and a lefthand threaded second shaft section extending from a second end of said electric motor, with said first shaft section disposed coaxially in said first telescoping tube pair and said second shaft section disposed coaxially in said second telescoping tube pair;

(g) a first thread follower is attached to an inner wall of said inner tube of said first telescoping tube pair and surrounds and engages said first shaft section to cause said inner tube of said first telescoping tube pair to move axially within said outer tube of said first telescoping tube pair as said first shaft section rotates; and (h) a second thread follower is attached to an inner wall of said inner tube of said second telescoping tube pair and surrounds and engages said second shaft section to cause said inner tube of said second telescoping tube pair to move axially within said outer tube of said second telescoping tube pair as said second shaft section rotates;

whereby, rotation of said electric motor in a first direction will cause simultaneous outward movement of said inner tubes of said first and second telescoping tube pairs and rotation of said electric motor in a second direction will cause simultaneous inward movement of said inner tubes of said first and second telescoping tube pairs.

2. A horizontally adjustable microphone support, as defined in claim 1, wherein said means to simultaneously move is remotely controlled.

* * * * *